E. P. BARTLETT.
DETACHABLE FINGER HOOK FOR FISHING RODS.
APPLICATION FILED JUNE 10, 1919.
1,331,312. Patented Feb. 17, 1920.
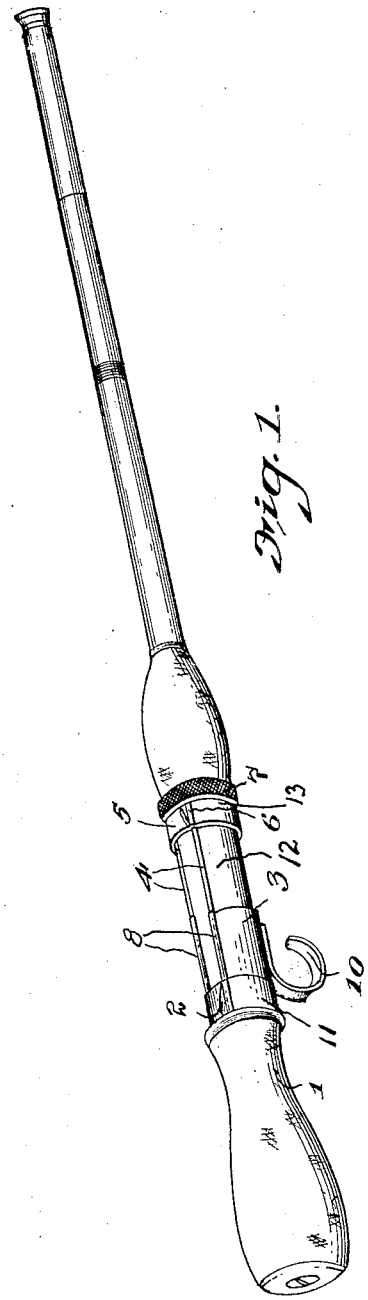
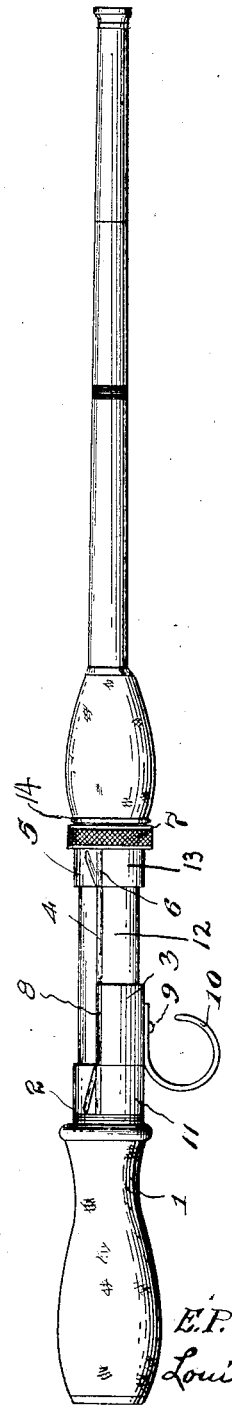
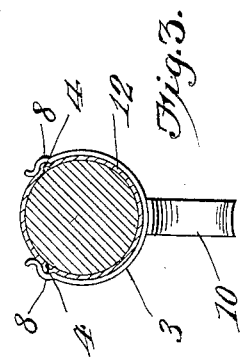
Inventor
E. P. BARTLETT,
By Louis H. Warner
Attorney

UNITED STATES PATENT OFFICE.

EUGENE P. BARTLETT, OF AMHERST, MASSACHUSETTS.

DETACHABLE FINGER-HOOK FOR FISHING-RODS.

1,331,312. Specification of Letters Patent. Patented Feb. 17, 1920.

Application filed June 10, 1919. Serial No. 303,187.

*To all whom it may concern:*

Be it known that I, EUGENE P. BARTLETT, a citizen of the United States, residing at Amherst, in the county of Hampshire and State of Massachusetts, have invented a new and useful Detachable Finger-Hook for Fishing-Rods, of which the following is a specification.

The object of my invention is to provide a device which can be readily attached to the reel seat of a fishing rod and which will make it much more convenient to control the rod and operate the reel. It is further an object of my invention to provide a device of such construction that it can be manufactured at small cost. I attain the objects of my invention by the device illustrated in the accompanying drawings, in which—

Figure 1 is a perspective of the device attached to a fishing rod;

Fig. 2 is a side elevation of same, and

Fig. 3 is a transverse sectional view taken just in front of the member 3 in Fig. 2 looking toward the rear of the device.

Referring to the accompanying drawings illustrating my invention, 1 designates the handle of the fishing rod and 12 the portion of the rod on which the reel is mounted. A suitable ring 11 having a raised portion 2, and which remains stationary is adapted to engage one end of the base plate of the reel, while a raised portion 5 of ring 13 engages the other end of the base plate of the reel. Ring 13 is provided with an annular flange 14 which retains the rotatable knurled securing ring 7 in position as shown, and by means of which ring 5 is secured at any desired position on the reel seat to cause the raised portion 5 of ring 13 to engage the base plate of the particular reel employed, and make the device adjustable to reels of different sizes. The reel seat 12 is provided with longitudinal spaced ribs 4 and ring 5 is provided with grooves 6 slidably engaging the ribs 4.

I provide a curved or substantially semi-circular resilient strip 3, preferably of metal having raised longitudinal grooves 8 along its longitudinal edges adapted to engage the ribs 4 of the reel seat to detachably secure the device to the portion 12 of the fishing rod. I provide a curved fingerhold or hook 10 suitably affixed to curved strip 3, fastened by a small rivet or pin 9. Any suitable means of attaching member 10 to member 3 may be employed, however. Member 10 is concave in cross section whereby the index finger of the fisherman may more comfortably and conveniently grasp it.

This device can be attached to the reel seat at any time whether the reel is on or off. By just taking hold of the finger hook 10 and turning it sidewise the raised grooves 8 will be disengaged from the ribs 4 of the reel seat and the device will slip off readily.

What I claim is:

1. A detachable finger hook for fishing rods comprising a resilient curved strip of sufficient size to encircle the major portion of the fishing rod, said strip having longitudinal grooved edge portions adapted to engage the ribs of a reel seat, and a fingerhold member affixed to and depending from the aforesaid curved strip.

2. A detachable finger hook for fishing rods, comprising a curved strip of metal shaped to releasably engage the reel seat, and a finger hold member affixed to the said curved strip, the finger hold member being formed of a narrow strip of metal concaved in cross section to enable it to be conveniently grasped by the finger.

EUGENE P. BARTLETT.

Witness:
EDWARD L. SHAW.